United States Patent [19]

Haddad, Jr.

[11] Patent Number: 5,205,605
[45] Date of Patent: Apr. 27, 1993

[54] COVER FOR AN OPEN TOP RECEPTACLE

[75] Inventor: Edward N. Haddad, Jr., Worcester, Mass.

[73] Assignee: Pioneer Consolidated Corporation, North Oxford, Mass.

[21] Appl. No.: 858,398

[22] Filed: Mar. 26, 1992

[51] Int. Cl.⁵ .............................................. B60P 7/02
[52] U.S. Cl. ................................... 296/98; 242/86.52
[58] Field of Search ........................ 296/98; 242/86.52

[56] References Cited

U.S. PATENT DOCUMENTS

| | | | |
|---|---|---|---|
| 1,750,285 | 3/1930 | Schuler | 160/66 |
| 1,751,735 | 3/1930 | Hicinbothem | 296/141 |
| 1,827,059 | 10/1931 | Woolcott | 296/105 |
| 2,591,186 | 4/1952 | Neitzke | 296/98 |
| 2,594,597 | 4/1952 | Taylor | 296/100 |
| 2,811,321 | 10/1957 | Barre | 296/98 |
| 3,041,104 | 6/1962 | Richard | 296/100 |
| 3,416,834 | 12/1968 | Morse, Jr. | 296/100 |
| 3,806,185 | 4/1974 | Brandjord | 296/98 |
| 3,833,255 | 9/1974 | Logue | 296/137 B |
| 3,841,697 | 10/1974 | McFarland | 296/100 |
| 3,910,629 | 10/1975 | Woodard | 296/137 B |
| 3,942,830 | 3/1976 | Woodard | 296/105 |
| 3,964,781 | 6/1976 | Fenton | 296/100 |
| 3,975,047 | 8/1976 | McClellan | 296/100 |
| 4,023,857 | 5/1977 | Killion | 296/98 |
| 4,027,911 | 6/1977 | Johnson | 296/23 H |
| 4,030,780 | 6/1977 | Petretti | 296/100 |
| 4,032,186 | 6/1977 | Pickering et al. | 296/100 |
| 4,046,416 | 9/1977 | Penner | 296/98 |
| 4,050,734 | 9/1977 | Richard | 296/98 |
| 4,095,840 | 6/1978 | Woodard | 296/100 |
| 4,157,202 | 6/1979 | Bachand | 296/100 |
| 4,189,178 | 2/1980 | Cramaro | 296/105 |
| 4,203,174 | 5/1980 | Shults | 4/172 |
| 4,216,990 | 8/1980 | Musgrove et al. | 296/213 |
| 4,295,262 | 10/1980 | Grote et al. | 29/462 |
| 4,341,416 | 7/1982 | Richard | 296/98 |
| 4,469,317 | 9/1984 | Grote et al. | 269/69 |
| 4,494,707 | 1/1985 | Niibori et al. | 242/67.2 |
| 4,516,802 | 5/1985 | Compton | 296/98 |
| 4,518,194 | 5/1985 | Kirkham et al. | 296/100 |
| 4,740,029 | 4/1988 | Tuerk | 296/100 |
| 4,842,323 | 6/1989 | Trickett | 296/98 |
| 4,874,196 | 10/1989 | Goldstein et al. | 296/98 |

FOREIGN PATENT DOCUMENTS

1060927 8/1979 Canada .................................. 296/77

*Primary Examiner*—Robert R. Song
*Attorney, Agent, or Firm*—Weingarten, Schurgin, Gagnebin & Hayes

[57] ABSTRACT

An open top receptacle cover apparatus is provided for completely covering an open top receptacle. The apparatus includes a cover having a main portion, a pair of descending side portions, and an end portion. The cover is stored on a roller mounted on a first end of the receptacle, and is extendable from the first end to a second end after being pulled off the roller. As the cover moves across the opening of the receptacle, a guide assembly mounted at the first end urges each descending side portion from a rolled condition to an extended condition that reaches partly down each of the two sides of the receptacle. The width of the cover in the rolled condition is generally equal to the width of the open top receptacle.

26 Claims, 10 Drawing Sheets

COVER FOR AN OPEN TOP RECEPTACLE

FIELD OF THE INVENTION

The invention relates to apparatus for covering open top receptacles.

BACKGROUND OF THE INVENTION

Open top receptacles, such as open bed trailers, railroad cars, or other containers, either mobile or stationary, frequently must be covered, such as when loaded with loose material. The cover prevents the material within the container from being blown from the container either by the wind or by the flow of air induced when the container moves. Also, many materials, such as sand or grain, must be protected from the elements, and a cover provides such protection. Further, materials such as cement or refuse must be maintained within the confines of the receptacle to protect the environment.

Large open top receptacles are constructed with an open top for easy top loading. The requirements of a cover are fulfilled by providing a flexible removable cover, such as one made of canvas, which is secured over the top of the open top receptacle once the material to be contained has been loaded. Although a simple fabric sheet may be used as a cover, the problems of handling such a large piece of fabric material and of storing the cover when it is not positioned over the open top receptacle makes such a solution less than optimal. Covers that are stored on a roll and are extended over the opening of the receptacle are an improvement over a simple fabric sheet, but fail to adequately cover the opening near the edges of the receptacle, allowing material to escape.

Commonly, a receptacle cover of a truck will add significant height to the truck because the roll that stores the cover resides over the major plane of the cover. The added height can result in a serious vertical clearance problem whenever the truck attempts to travel under an overpass with a height less than the combined heights of the truck and the roll. It is also known for the mechanism used to move a receptacle cover over the opening of the receptacle to be wider than the receptacle itself, thereby creating the possibility for a horizontal clearance problem.

SUMMARY OF THE INVENTION

An open top receptacle cover apparatus is provided for completely covering an open top receptacle. The apparatus includes a cover having a main portion, a pair of descending side portions, and an end portion. The cover is stored on a roller mounted on a first end of the receptacle, and is extendable from the first end to a second end after being pulled off the roller. In a preferred embodiment, the roller is mounted below a major plane of the cover. As the cover moves across the open opening of the receptacle, a guide assembly mounted at the first end urges each descending side portion from a rolled condition to an extended condition that reaches partly down each of the two sides of the receptacle. The width of the cover in the rolled condition is generally equal to the width of the open top receptacle.

The guide assembly has a plurality of guide rollers that cooperate with each of a pair of ropes sewn into a hem in each descending side portion wherein each guide roller slidably confines at least one of the pair of ropes. A beam is connected to the main portion of the cover that pulls the cover from the first end to the second end, and a lead bow then leads the end portion by pulling it over and partly down a wall of the second end. To extend the cover over the opening of the receptacle, a pair of pulleys is driven to move a cable connected to the beam which is thereby pulled towards the second end. To retract the cover onto the roller, the roller is driven by a motor. Each descending side portion includes at least one folding region that promotes folding, thereby avoiding disorderly folding activity in other regions of the descending side portion when the cover is retracted. Preferably, the descending side portions are made of nylon coated with RFL (resource formaldehyde latex), and the main portion is made from polypropylene. Vinyl-coated nylon (waterproof) can also be used when the contents must be kept dry. The open top receptacle cover apparatus of the invention adequately covers the opening near the sides, front and back of the receptacle, thereby preventing material contained therein from escaping, and keeping the contents dry. Further, since the roller is mounted below the major plane of the cover, the apparatus of the invention does not significantly increase the clearance requirements of a receptacle with the apparatus mounted thereon. Also, even though the entire cover, including the pair of descending side portions, is wider than the receptacle in a flattened state, the apparatus of the invention insures that the cover is folded to a width that is narrower than the receptacle, thereby avoiding horizonal clearance problems due to the cover.

DESCRIPTION OF THE DRAWINGS

The invention will be more fully understood from the following detailed description, in conjunction with the accompanying figures in which.

DETAILED DESCRIPTION OF THE INVENTION

Figure 1:
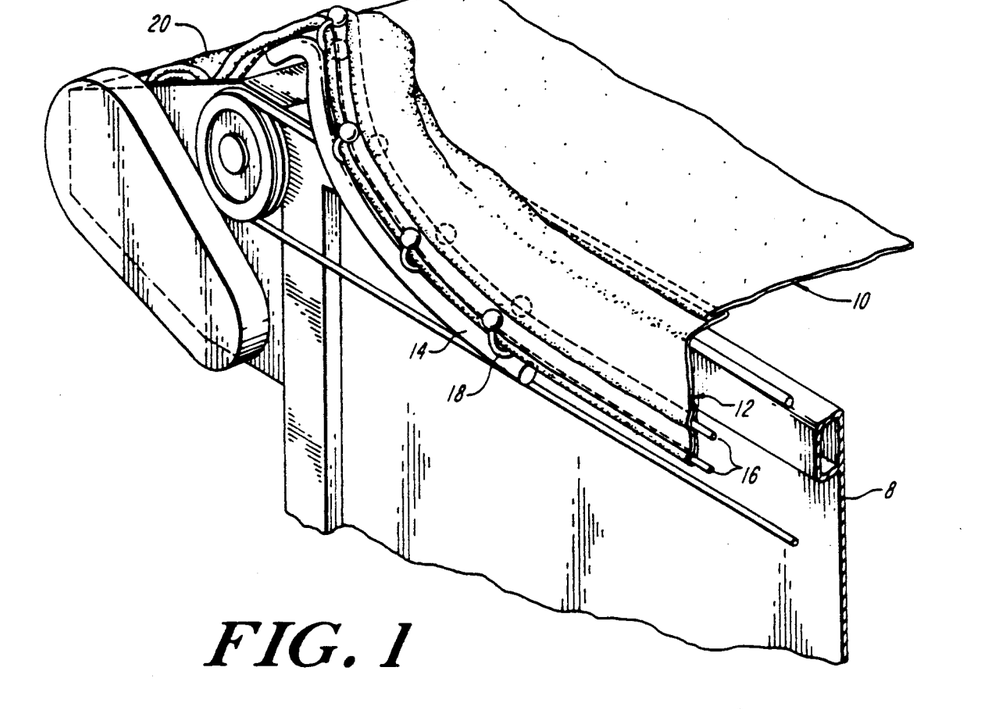
FIG. 1 is a perspective view of the cover of the invention in a partly deployed state.

With reference to FIG. 1, the cover of the invention is adapted to effectively cover the entire opening of an open top receptacle, such as a truck body. To insure that areas near the walls 8 of the receptacle are protected, a cover 10 that includes a descending side portion 12 is extended over the entire opening of the receptacle, and over a portion of each of its walls 8. Such extension is accomplished by means of a guide tube 14 that is cooperative with a double bolt rope 16 that is sewn into the hem of each descending side portion 12 of the cover 10. The guide tube 14 has a plurality of guide rollers 18 disposed along its length. As the cover 10 is pulled off a roller 20 and is extended over the opening of the receptacle, the guide rollers 18 steer the double bolt rope 16 from its folded position to its deployed position. The roller 20 is disposed below a major plane of cover 10 to avoid vertical clearance problems in applications such as truck bodies.

Figure 2A:
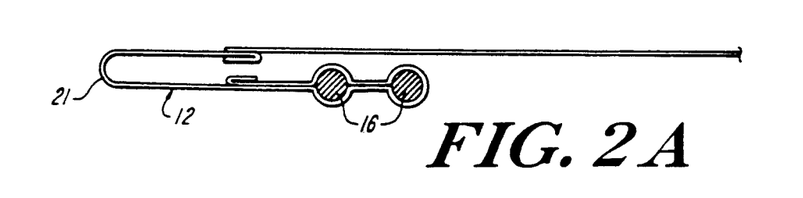
FIGS. 2A and 2B are cross-sectional views of a descending side portion of the cover.
Figure 2B:
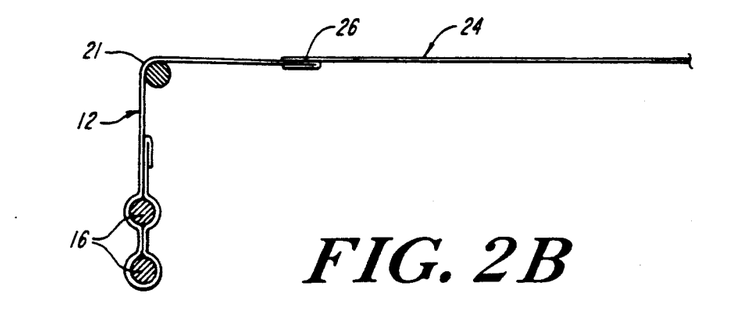

Referring to FIGS. 2A and 2B, the double bolt rope 16 is in its folded position when the descending side portion 12 is folded, as shown in FIG. 2A, and is in its deployed position when the descending side portion 12 is deployed, as shown in FIG. 2B. Preferably, the descending side portion includes at least one folding region 21 that is predisposed to promote folding, thereby avoiding disorderly folding activity in other regions of the descending side portion 12. Orderly folding behavior is desirable because it promotes compact storage of the cover 10 on the roller 20 upon retraction and storage of the cover 10. For example, to promote folding in the folding region 21, the region between the folding region 21 and at least the first of the two bolt ropes 16 can be made of a durable, pliant material, such as RFL (resource formaldehyde latex) coated nylon (14 oz./sq. yd.), and this region can be stitched to the main portion 24 of the cover 10 along a seam 26 within the folding region 21, where the main portion 24 is made from, for example, polypropylene (8 oz./sq. yd.).

Figure 3A:
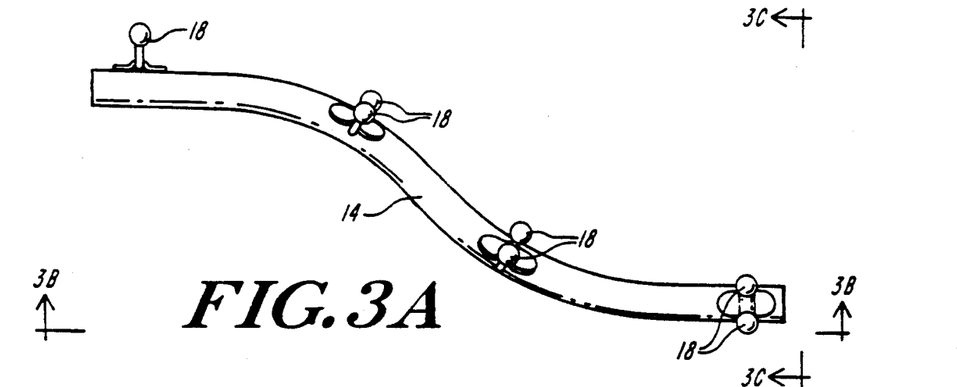
FIG. 3A, 3B, and 3C are plan, side elevation and end elevation views of a guide tube and its associated rollers.
Figure 3B:
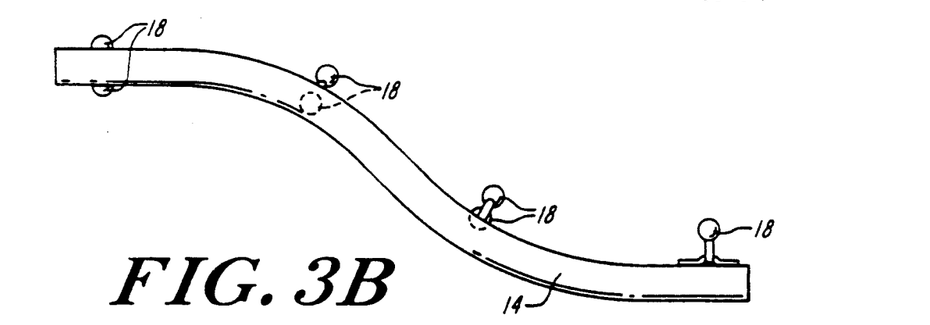
Figures 3C, 5A:
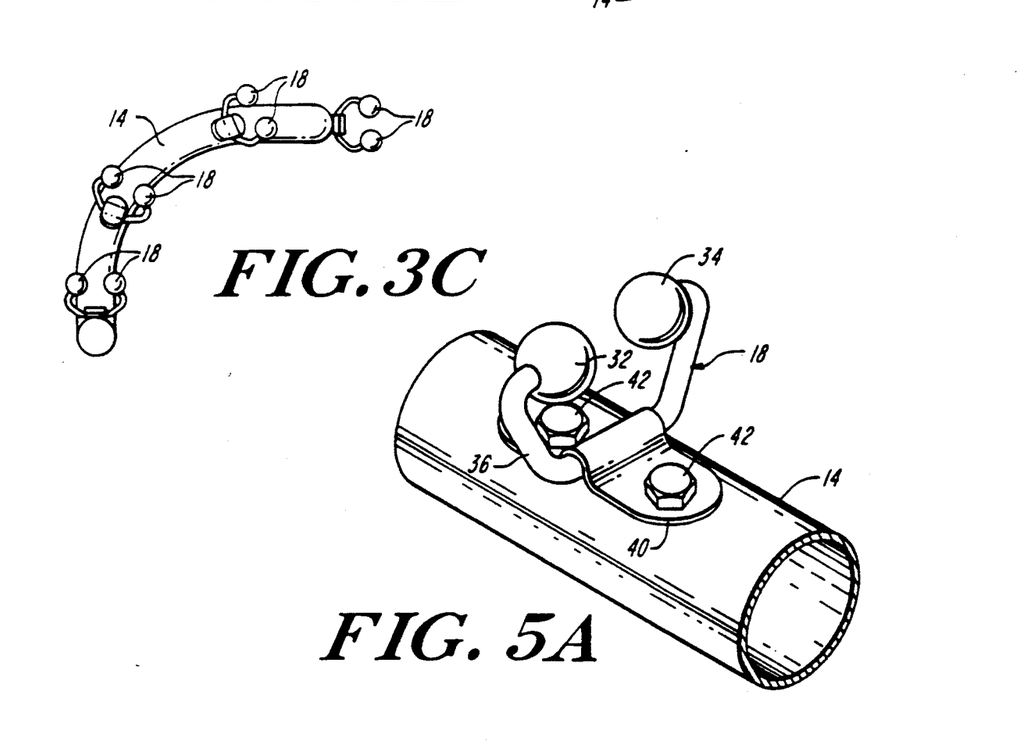
FIGS. 5A, 5B, and 5C are perspective and elevation views of a portion of the guide tube and a detail view of an attached roller.
Figures 4, 5B:
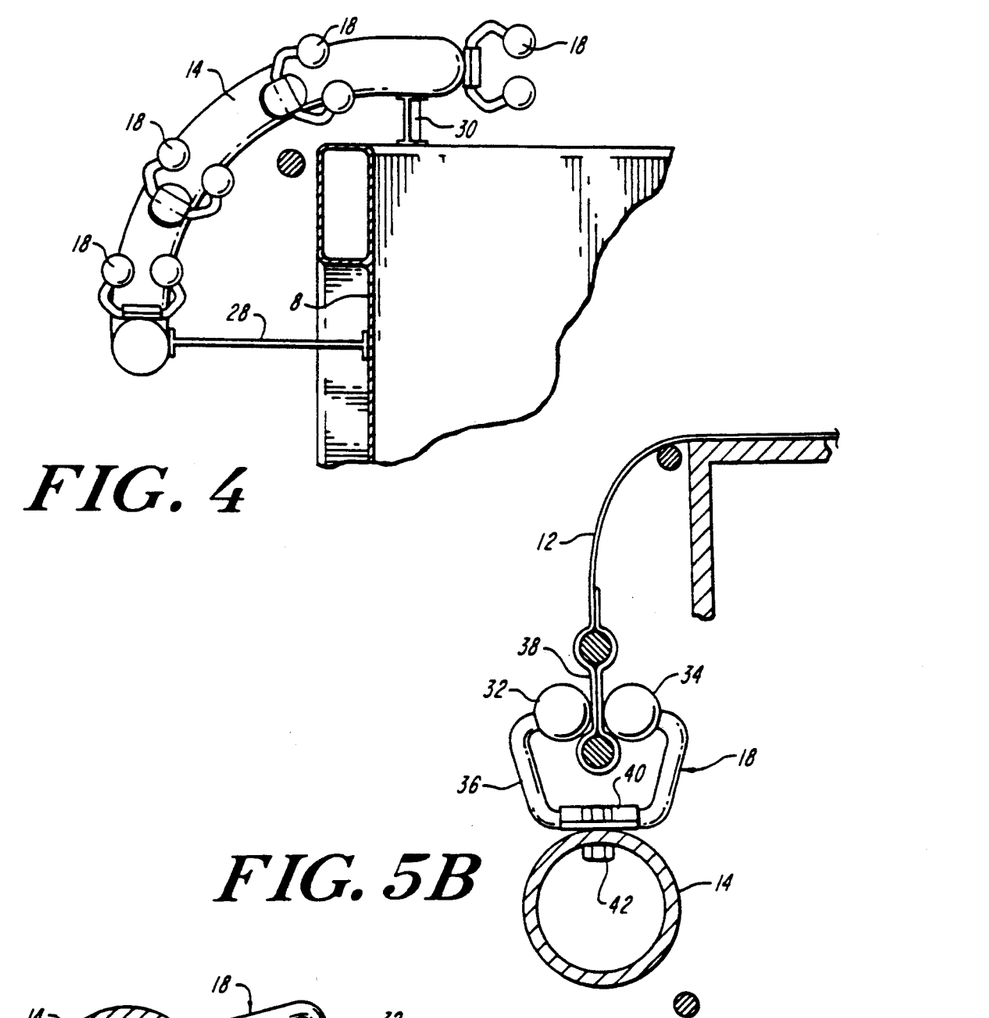
FIG. 4 is an end elevation view of a guide tube attached to a receptacle.

With reference to FIGS. 3A, 3B, and 3C, the guide tube 14 is shaped so as to place each of the guide rollers 18 in a position to contribute to urging the double bolt rope 16 from its folded position to its deployed position. Viewed from the top, as in FIG. 3A, the guide tube 14 and its rollers 18 move the double bolt rope 16 in a direction parallel to the axis of the roller 20 and away from the wall 8 of the receptacle. Additionally and simultaneously, the guide tube 14 pulls the double bolt rope 16 downward, as shown in FIG. 3B. The combination of each component of the shape of the guide tube 14 is visible in FIG. 3C. Referring to FIG. 4, the guide tube is mounted to the side and the top of the wall 8 of the receptacle via mounting brackets 28 and 30.

Figure 5C:
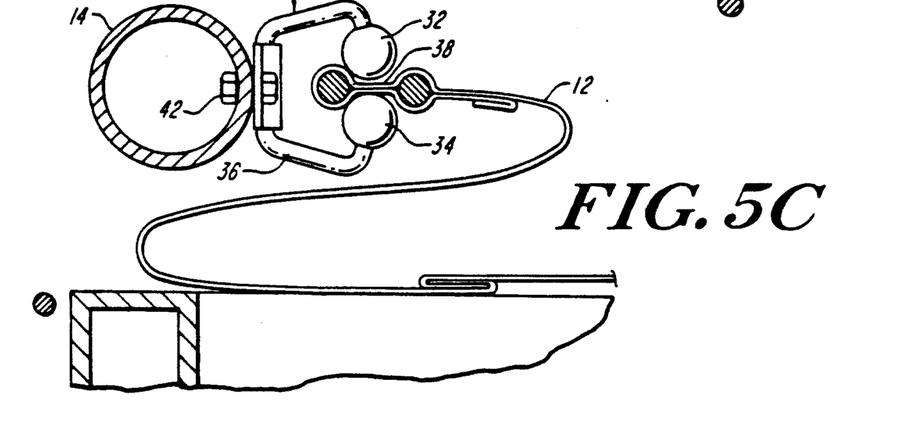

Referring to FIGS. 5A, 5B, and 5C, the rollers 18 include two spheres 32 and 34 that are held in place by a support element 36 such that the distance between them is less than the diameter of each of the bolt ropes 16, and slightly greater than the thickness of the region 38 of the side portion 12 that is bounded by the two bolt ropes 16. The support element is fastened to the guide tube 14 via a bracket 40 and a pair of fasteners 42. FIG. 5B shows a roller 18 disposed towards the second end of the receptacle and cooperative with the descending side portion 12 in its deployed state. FIG. 5C shows a guide roller 18 disposed proximate to the roller 20 and cooperative with the descending side portion 12 in its folded state.

Figure 6:
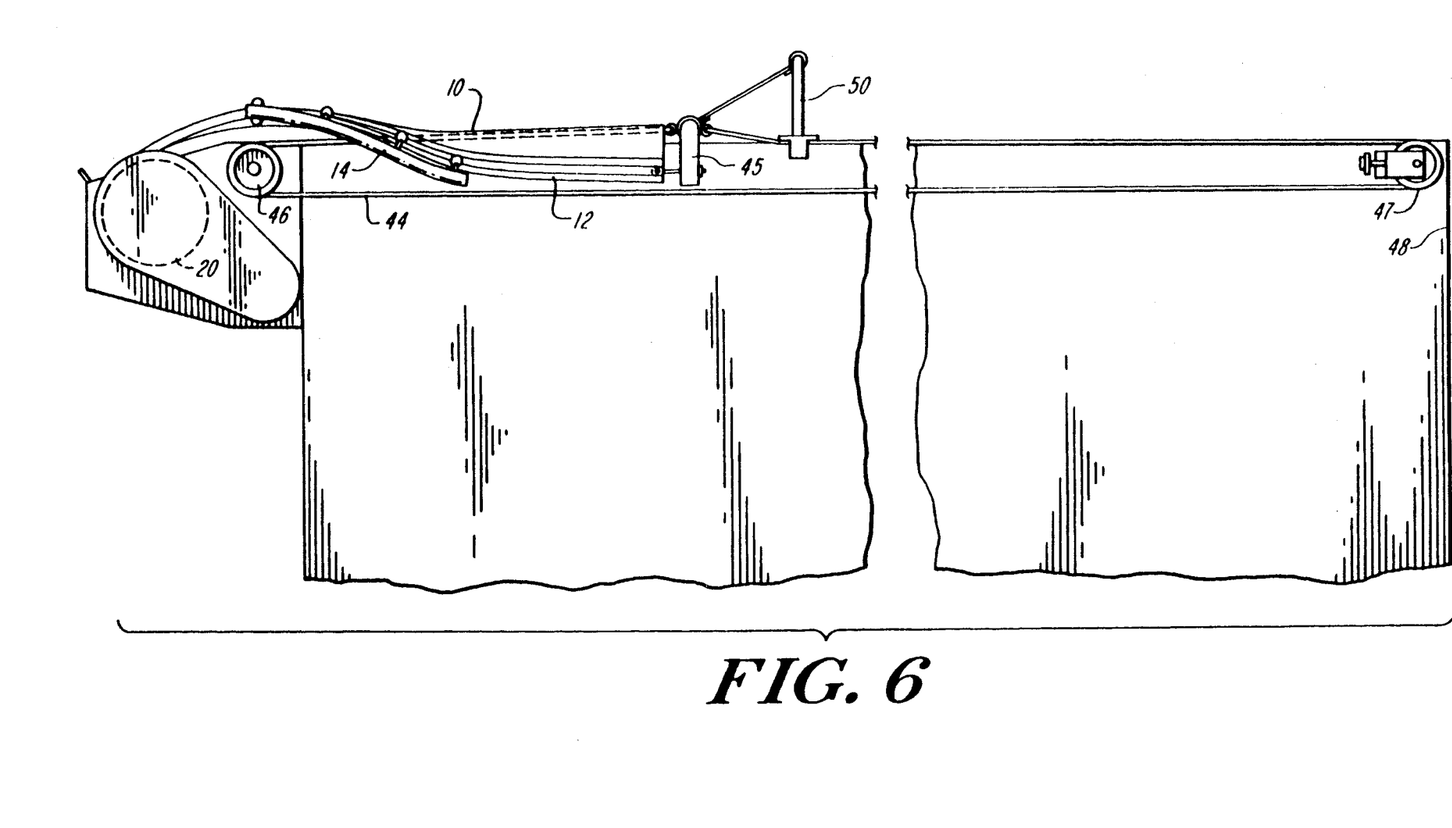
FIG. 6 is a side view of the cover of the invention illustrating its operation.

With reference to FIG. 6, a cable loop 44 is driven in a clockwise direction by a cable drive pulley 46 which is powered by, for example, an electric motor (see FIG. 7), or other such drive means, including a pneumatic or hyraulic motor, as is known in the art. The cable loop 44 returns to the roller 20 over an undriven idler pulley 47. A beam 45 that extends along the rear edge of the cover 10 and over each side 8 is attached to the cable loop 44 and is pulled thereby away from the roller 20 and the towards the end-wall 48 of the receptacle. A lead bow 50 is also attached to the cable loop and is also thereby moved along with the beam 45 towards the end-wall 48. When the beam 45 reaches near the idler pulley 47, the lead bow 50 tips over the end-wall 48, serving to pull the end of the cover 10 down the end-wall 48 to an extent roughly equal to the extent the descending side portion 12 of the cover 10 extends downward.

Figure 9:
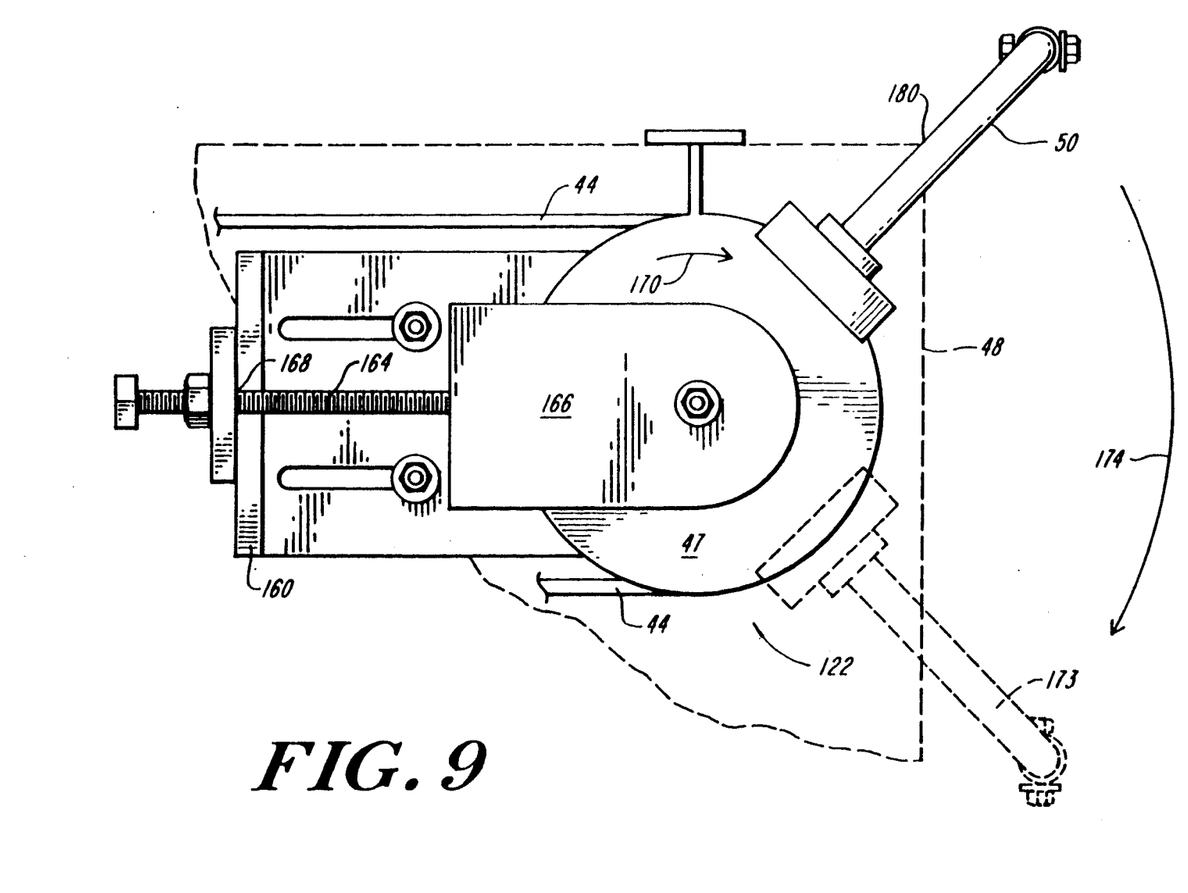
FIG. 9 is a is a side view of the pull-down assembly of the invention.
Figure 10:
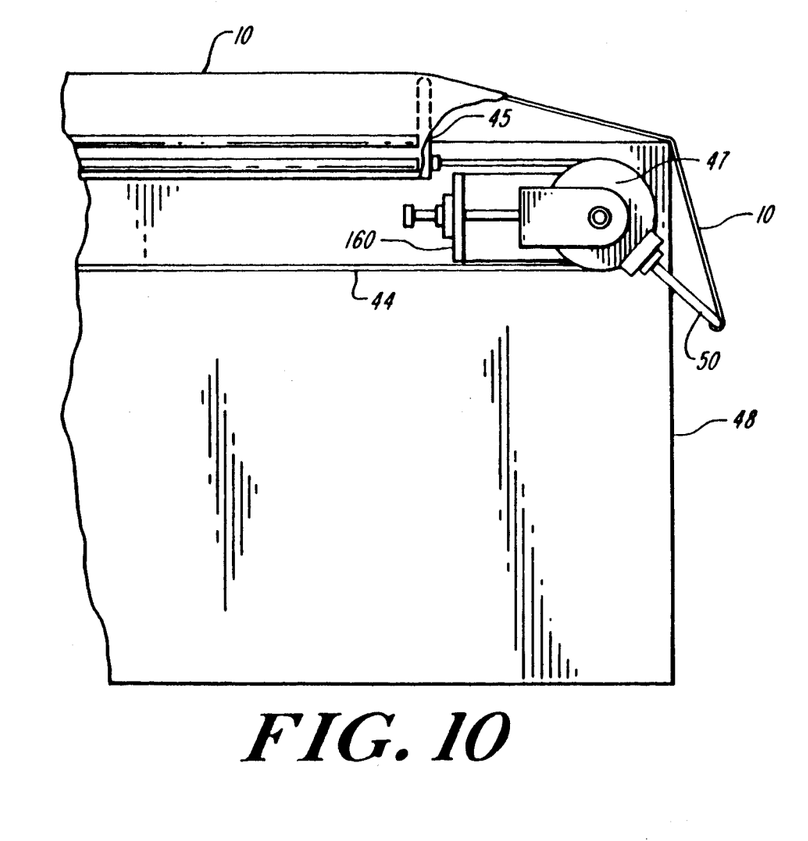
FIG. 10 is a side view of the pull-down assembly of the present invention with the flexible cover in fully extended position.

With reference to FIGS. 9 and 10, the lead bow 50 is fixedly attached to the cable 44. Accordingly, motivation of the cable 44 causes motivation of the lead bow 40, which in turn pulls the beam 45 and the cover 10.

Referring to FIG. 9, an embodiment of the pull-down assembly 122 of the present invention is illustrated. Pull-down assembly 122 is mounted adjacent the rear end 48 of the trailer, by mounting plate 160. A corresponding pull-down assembly (not shown) is mounted on the opposite side of the receptacle. Pull-down assembly pulley 47 is mounted in sliding relationship with respect to the mounting plate 160. An adjusting screw 164 is connected to a bracket 166 and cooperates with a screw-threaded aperture 168 in the mounting plate 160 to permit the slidable adjustment of the pull-down assembly pulley 47 and provide a predetermined tension in the cable 44.

Figure 7:
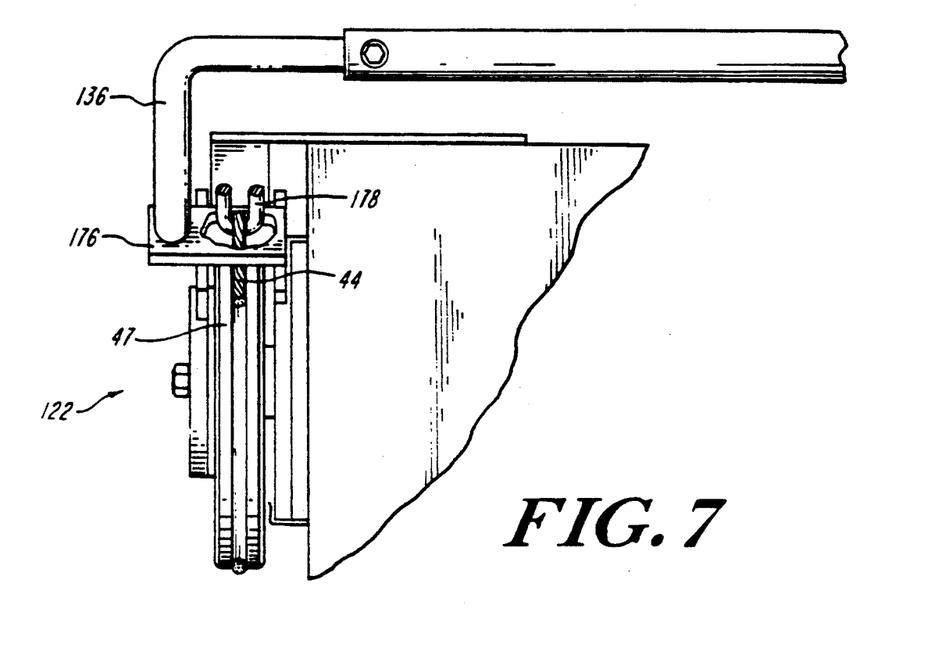
FIG. 7 is an end view of the pull-down assembly of the present invention.
Figure 8:
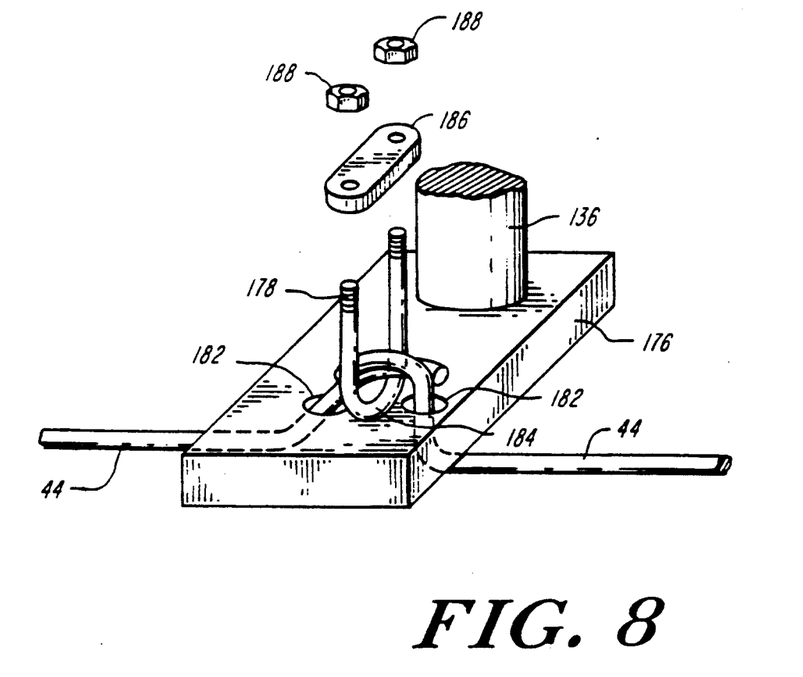
FIG. 8 is a projective view of the u-clamp means of the invention.

In FIG. 7, an end view of a pull-down assembly 122 is illustrated. The cable 44 is shown mounted on the pull-down assembly pulley 47. End portion 136 of the lead bow 50 is connected to an attaching plate 176 which in turn is connected to the cable 44 by conventional means such as by a cable clamp 178, as shown in FIG. 8. Referring to FIG. 8, each end of the cable 44 passes through a respective hole 182 in the attaching plate 176. Each end of the cable 44 is retained in overlapping relationship in the u-portion 184 of the cable clamp 178 by cable clamp plate 186 which is slidably mounted on the cable clamp 178. The cable clamp 178 is welded to the attaching plate 176. Cable clamp plate 186 is retained in sliding engagement on cable clamp 178 and abutting one or both ends of the cable 44 by retaining nuts 188 which cooperate with screw threads on the cable clamp 178.

As shown in FIGS. 7, 8, 9, and 10 the end portion 136 of the lead bow 50 is disposed on the pull-down pulley 47 adjacent the read end 48 of the receptacle, indicating that the cover 10 has been drawn across to the cover the opening of the receptacle. rotation of the pulley 47 in a first direction, as indicated by an arrow 170 causes the lead bow 50 to rotate about the pulley 47 as indicated by an arrow 174. Downward movement of the lead bow 50 ceases when the lead bow 50 abuts the rear end 48 of the receptacle. Once the lead bow 50 is pulled down to the position indicated by reference numeral 173, the cover 10 downwardly overlaps the upper edge 180 of the receptacle to ensure that no portion of the opening of the trailer is upwardly exposed. Accordingly, rain is excluded from the receptacle and the likelihood of escape of load is minimized.

Figure 11:
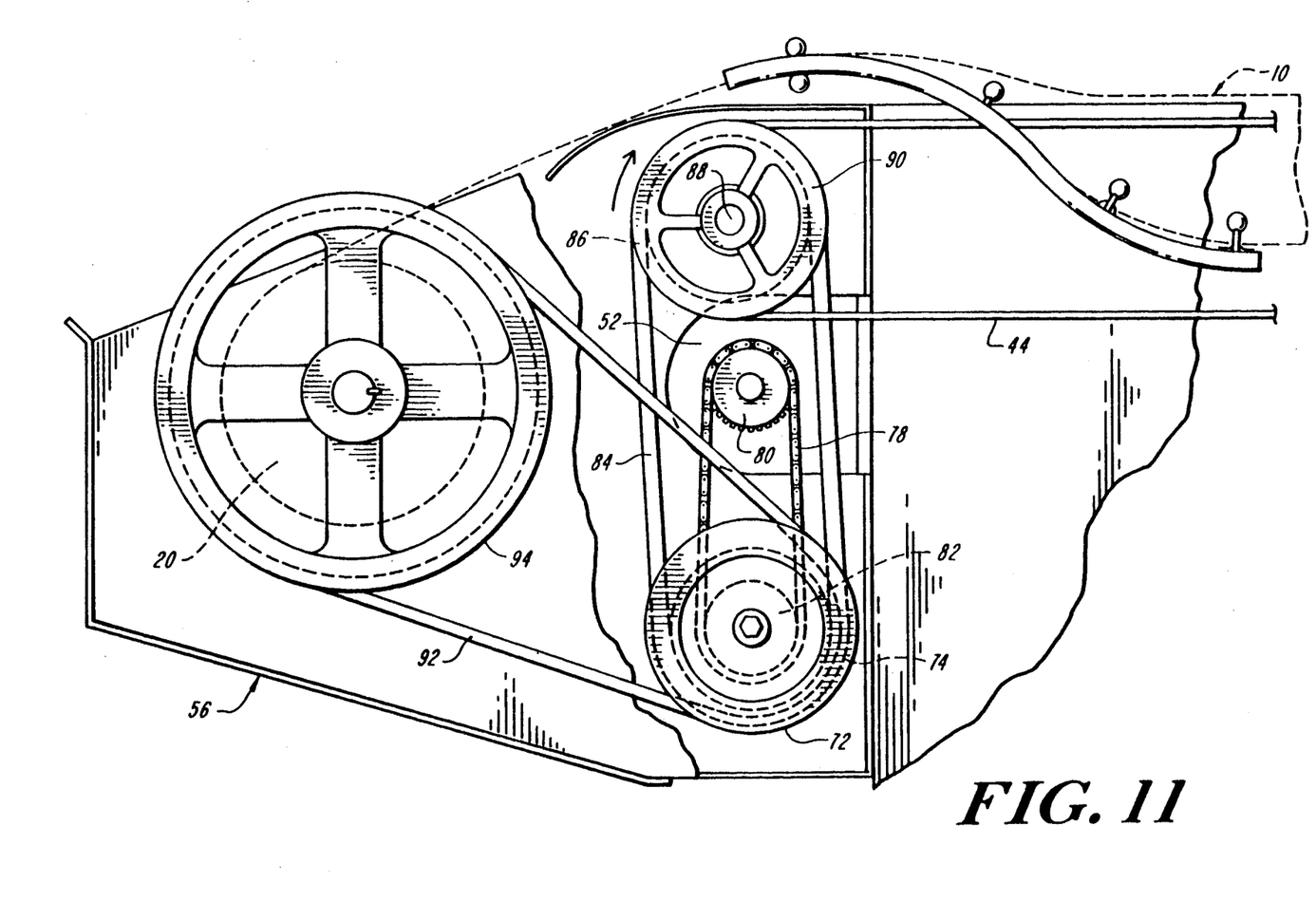
FIG. 11 is a side view of a mechanism for driving the cover over the receptacle to be covered.
Figure 12:
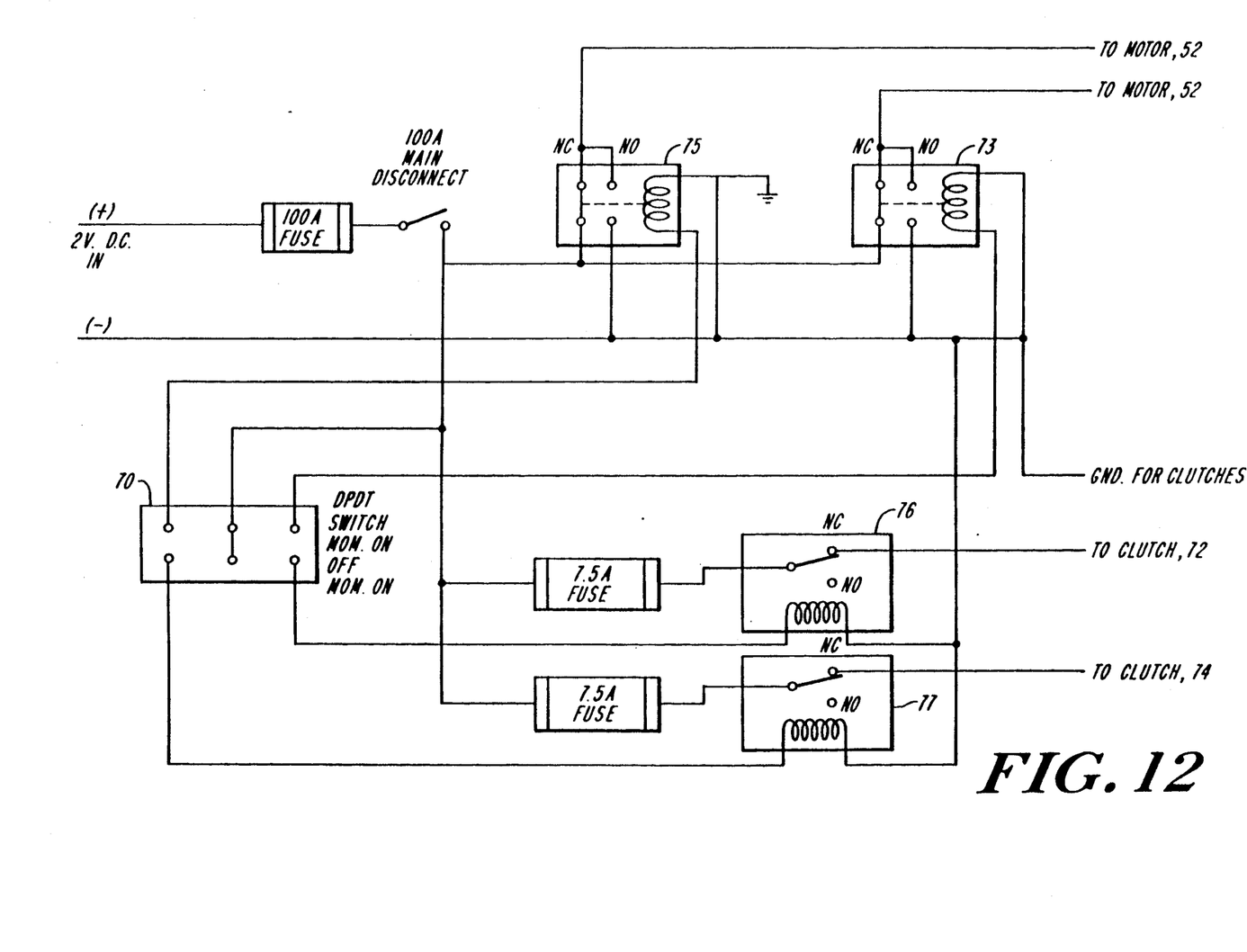
FIG. 12 is a schematic diagram of a circuit for controlling the movement of the cover of the invention.

Referring to FIGS. 11 and 12, electrical and mechanical operation of a preferred embodiment of the invention will now be discussed. The motor 52 and a pair of clutches 72 and 74 are electrically operated using 12 volt DC power, and are activated by a double pole-double throw switch 70.

When the switch 70 is in a central, unactuated position, the motor 52 is not energized, and the clutches 72 and 74 are engaged (energized). The roller 20 and the cable 44 are thereby locked in either a covered, an uncovered, or an intermediate position.

When the switch 70 is in a first actuating position, the motor 52 is energized by energizing a relay 73 so as to rotate in a clockwise direction, and the roller clutch 72 is disengaged by energizing a relay 76 to allow free rotation of the roller 20. The motor 52 drives a chain 78 that drives the clutches 72 and 74 via a sprocket 80 and a jack shaft 82. The cable drive shaft clutch 74 remains engaged, thereby transmitting rotation from the jackshaft 82 to the cable 44 via a V-belt 84, a drive shaft pulley 86, drive shaft 88, and cable drive pulley 90. As the cable loop 44 is rotated in a clockwise direction, it unwinds the cover 10 from its stored position on the roller 20. The disengagement of the roller clutch 72 allows the cover 10 to be pulled off of the roller 20 and towards the back of the receptacle until it is covered. When the cover 10 reaches the end of the receptacle, the user returns the switch 70 to its central, unactuated position, thereby disabling the motor 52 and engaging the roller clutch so as to lock the cover 10 in position.

When the switch 70 is in a second actuating position, the motor 52 is energized by energizing a relay 75 so as to rotate in a counter-clockwise direction, and the drive shaft clutch 74 is disengaged by energizing a relay 77 to allow free rotation of the drive shaft 88. The motor 52 drives a chain 78 that drives the clutches 72 and 74 via a sprocket 80 and a jack shaft 82. The roller clutch 72 remains engaged, thereby transmitting torque from the jackshaft 82 to the roller 20 via the V-belt 92 and the roller pulley 94. As the cover 10 is wound onto the roller 20 in a counter-clockwise direction, it pulls the cable loop 44 along with the rear section 45 (beam) and the lead bow 50 to the front of the receptacle. The disengagement of the drive shaft clutch 74 allows the cable to be moved to the front of the receptacle to be rolled onto the roller 20 in a stored position. When the receptacle has been completely uncovered, the switch 70 is returned to its central, unactuated position, which stops the motor and engages the drive shaft clutch 78 so as to lock the cable loop 44 and the associated cover 10 position.

A protective shield 56 protects the roller 20, as well as the motor 52 and all of the other parts used to move the cable and the associated cover 10.

Figure 13:
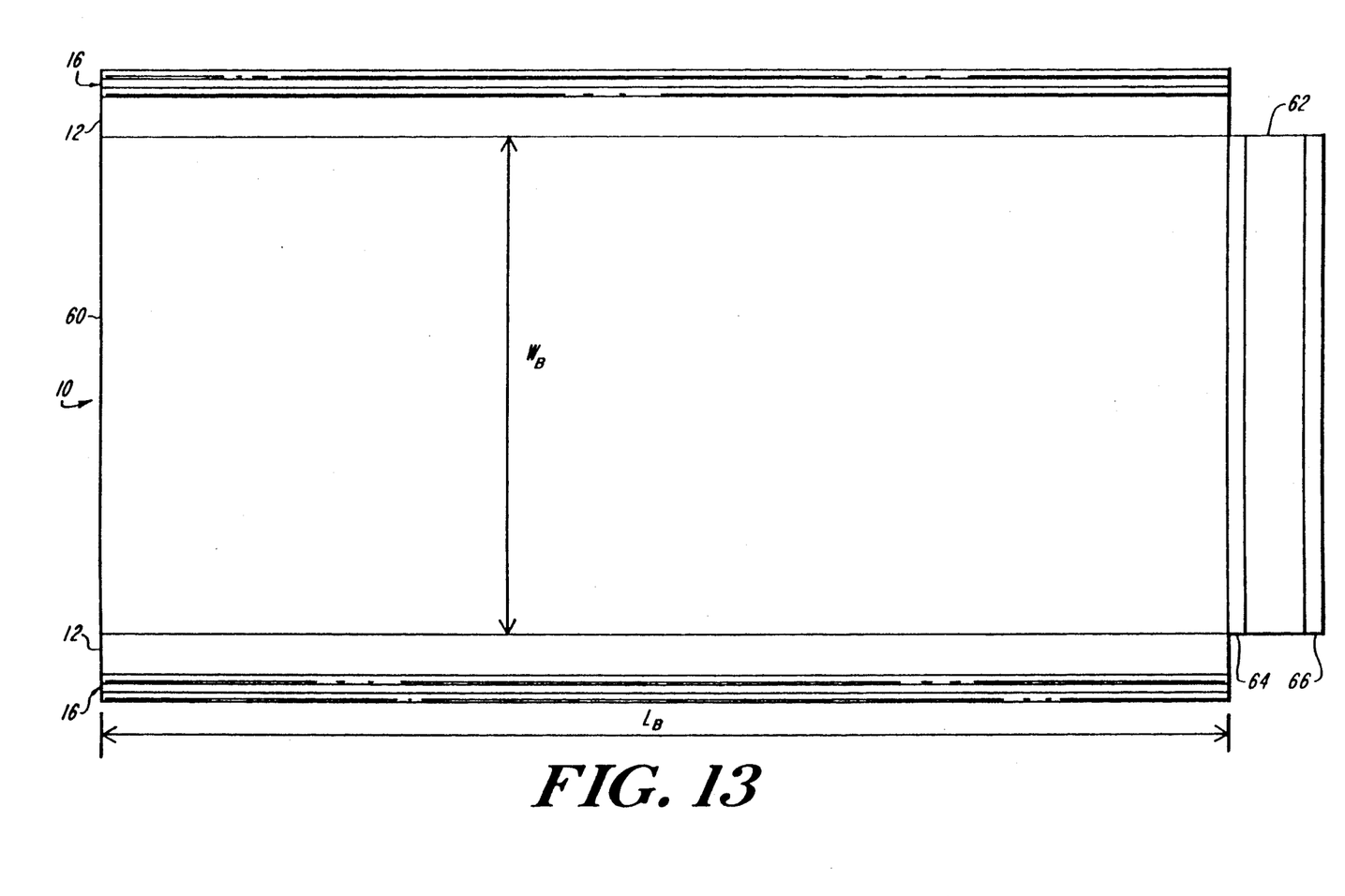
FIG. 13 is a plan view of a cover with its descending side portions and its end portion.

FIG. 13 shows the cover 10 including two pairs of bolt ropes 16 that extend along both drop portions 12. The central portion 60 of the cover 10 is substantially as wide as the width of the body $W_B$, and is substantially as long as the length of the body $L_B$. An end portion 62 includes a first long pocket 64 that receives the beam 45, and a second long pocket 66 that receives the lead bow 50.

Other modifications and implementations will occur to those skilled in the art without departing from the spirit and the scope of the invention as claimed. Accordingly, the above description is not intended to limit the invention except as indicated in the following claims.

What is claimed is:

1. An open top receptacle cover apparatus for covering an open top receptacle having a first end, a second end, and two sides, the apparatus comprising:
   a cover having a main portion and descending side portions, and extendable from said first end to said second end;
   a beam, connected to said main portion of said cover, for extending said cover from said first end to said second end;
   a driven pulley;
   an undriven pulley;
   a cable, connected to said beam, movably mounted on said driven pulley and said undriven pulley, and driven by said driven pulley so as to urge said beam towards said second end;
   a roller, mounted at said first end, for storing said cover in a rolled condition; and
   a guide assembly, mounted at said first end, for urging each said descending side portions between an extended condition extending partly down each of said two sides, and said rolled condition as said cover moves across said open top receptacle, wherein the width of said cover in said rolled condition is generally equal to the width of said open top receptacle.

2. The open top receptacle cover apparatus of claim 1 wherein said cover further comprises an end portion, connected to said main portion, for extending partly down said second end.

3. The open top receptacle cover apparatus of claim 1 wherein each said descending side portion includes a hem and a pair of ropes sewn into said hem for slidable engagement with said guide assembly.

4. The open top receptacle cover apparatus of claim 3 wherein said guide assembly includes a plurality of guide rollers that cooperate with each of said pair of ropes such that each guide roller slidably confines at least one member of said pair of ropes.

5. The open top receptacle cover apparatus of claim 2 further comprising a lead bow for pulling said end portion over and down a wall of said second end.

6. The open top receptacle cover apparatus of claim 1 wherein said roller is driven by a motor from time to time, and said driven pulley is driven by said motor from time to time.

7. The open top receptacle cover apparatus of claim 1 wherein each of the descending side portions includes at least one folding region to promote folding, thereby avoiding disorderly folding activity in other regions of the descending side portion.

8. The open top receptacle cover apparatus of claim 1 wherein the descending side portion is made of RFL (resource formaldehyde latex) coated nylon.

9. The open top receptacle cover apparatus of claim 1 wherein the main portion is made from polypropylene.

10. The open top receptacle cover apparatus of claim 4 wherein said guide assembly further includes a guide tube shaped so as to place each of said guide rollers in a position to contribute to urging said descending side portion from its rolled condition to said extended condition.

11. The open top receptacle cover apparatus of claim 10, wherein said guide tube is shaped so as to displace the descending side portion outward from a side of the receptacle, simultaneously pulling it downward.

12. The open top receptacle cover apparatus of claim 1, further including a protective shield, connected at said first end, for protecting against the elements.

13. The open top receptacle cover apparatus of claim 1 wherein the roller is mounted below a major plane of the cover.

14. An open top receptacle cover apparatus for covering an open top receptacle having a first end, a second end, and two sides, the apparatus comprising:
   a cover, extendable from said first end to said second end, having a main portion, descending side portions, and an end portion for extending partly down said second end, wherein said each descending side portion includes a hem and a pair of ropes sewn into said hem;
   a roller, mounted at said first end, for storing said cover in a rolled condition; and
   a guide assembly, mounted at said first end, for urging each of said descending side portions between an extended condition extending partly down each of said two sides, and said rolled condition as said cover moves across said open top receptacle,
   said guide assembly including a plurality of guide rollers that cooperate with each of said pair of ropes such that each guide roller slidably confines at least one member of said pair of ropes, and a guide tube shaped so as to place each of said guide rollers in a position to contribute to urging said descending side portion from said rolled condition to said extended condition,
   wherein the width of said cover in said rolled condition is generally equal to the width of said open top receptacle.

15. The open top receptacle cover apparatus of claim 14 wherein said each descending side portion includes a hem and a pair of ropes sewn into said hem.

16. The open top receptacle cover apparatus of claim 14 further comprising a beam, connected to said main portion of said cover, for extending said cover from said first end to said second end.

17. The open top receptacle cover apparatus of claim 14 further comprising a lead bow for pulling said end portion over and down a wall of said second end.

18. The open top receptacle cover apparatus of claim 14, further comprising a driven pulley, an undriven pulley, and a cable movably mounted on said driven pulley and said undriven pulley, wherein said beam is connected to said cable, and said driven pulley is for urging said beam towards said second end.

19. The open top receptacle cover apparatus of claim 18 wherein said roller is driven by a motor from time to time, and said driven pulley is driven by said motor from time to time.

20. The open top receptacle cover apparatus of claim 1 wherein each of the descending side portions includes first and second folding regions that promote folding, thereby avoiding disorderly folding activity in other regions of the descending side portion.

21. The open top receptacle cover apparatus of claim 14 wherein the descending side portion is made of RFL (resource formaldehyde latex) coated nylon.

22. The open top receptacle cover apparatus of claim 14 wherein the main portion is made from polypropylene.

23. The open top receptacle cover apparatus of claim 14 wherein each of said guide rollers comprises:
   a support element attached to said guide tube; and
   two spheres, attached to and maintained in position by said support element such that the distance separating them is less than the diameter of each of said bolt ropes, and is slightly greater than the thickness of a region of said side portion that is bounded by said bolt ropes.

24. The open top receptacle cover apparatus of claim 22 wherein said support element is fastened to said guide tube via a bracket and a pair of fasteners.

25. The open top receptacle cover apparatus of claim 6 or 19, further including:
   a roller clutch for selectably transmitting a rotational driving force from said motor to said roller;
   a driven pulley clutch for selectably transmitting a rotational driving force from said motor to said driven pulley clutch; and
   a controller for controlling said roller clutch, said driven pulley clutch, and said motor.

26. The open top receptacle cover apparatus of claim 25 wherein said controller is for executing one of a covering mode, an uncovering mode and a stationary mode, wherein
   according to said covering mode, said controller energizes said motor so as to drive said driven pulley, and disengages said roller clutch to allow free rotation of said roller,
   according to said uncovering mode, said controller energizes said motor so as to drive said roller, and disengages said driven pulley clutch to allow free rotation of said driven pulley, and
   according to said stationary mode, said controller engages said driven pulley clutch and engages said roller clutch so as to fix said cover in a stationary position.

* * * * *